United States Patent [19]

Miyazawa

[11] Patent Number: 5,457,770
[45] Date of Patent: Oct. 10, 1995

[54] SPEAKER INDEPENDENT SPEECH RECOGNITION SYSTEM AND METHOD USING NEURAL NETWORK AND/OR DP MATCHING TECHNIQUE

[75] Inventor: Hideki Miyazawa, Tokyo, Japan

[73] Assignee: Kabushiki Kaisha Meidensha, Tokyo, Japan

[21] Appl. No.: 108,791

[22] Filed: Aug. 19, 1993

[51] Int. Cl.$^6$ .............................. G10L 5/00; G06F 15/18
[52] U.S. Cl. ...................... 395/2.64; 395/2.41; 395/2.45; 395/2.6; 395/2.61
[58] Field of Search .................................. 395/2, 2.41, 21, 395/22, 24, 2.68, 2.3, 2.6, 2.61, 2.64, 2.41, 24, 2.45

[56] References Cited

U.S. PATENT DOCUMENTS

| | | | |
|---|---|---|---|
| 4,637,045 | 1/1987 | Noso et al. | 381/43 |
| 4,799,261 | 1/1989 | Lin et al. | 381/36 |
| 4,937,872 | 6/1990 | Hopfield et al. | 381/43 |
| 4,975,961 | 12/1990 | Sakoe | 381/43 |
| 5,027,406 | 6/1991 | Roberts et al. | 395/2 |
| 5,060,278 | 12/1991 | Fukumizu | 382/14 |
| 5,175,793 | 12/1992 | Sakamoto et al. | 395/2 |

OTHER PUBLICATIONS

Phoneme-based Wnd Recognition by NN . . . Akihiro Hirai et al., IEEE 17–21 Jun. 1990.
A Hybrid NN, Dynamic programming word spotlov Zeppenfeld et al., IEEE 23–26 Mar. 1992.
A Speech Recognizer Optimally Combining Loorarms Vector Quantization, Dynamic Programming and Multi–Layer Percoh Drain Covrt et al., IEEE 23–26 Mar. 1992.
Word Recognition based in the Combination of a Sequential NN and the GPDM Discriminative training Chen et al. IEEE 1 Oct. 1991.
Takami et al., "Phoneme Recognitiion by Pairwise Discriminant TDNNs", ATR Interpreting Telephony Research Laboratories, vol. 16, pp. 677–680.
Ryohei Nakatsu, A Japanese Paper of Information Processing, vol. 24, No. 8, (Yokoshuki Electrical Communication Laboratory), pp. 984–992, 1983.
Kenichi Mori, Japanese book entitled "Pattern Recognition", Published by Shadan Hozin Electronic, Information, and Communication Society on Apr. 26, 1993, pp. 116–123.
Dayhoff, *Neural Network Architectures*, Chapter 5, 1990.
Lynn et al., "Introductory Digital Signal Processing with Computer Applications, FFT Processing", pp. 251–283, 1992.
Lynn et al., *Introductory Digital Signal Processing with Computer Application*, "The Fourier Transform Method", pp. 148–157, 1992.

*Primary Examiner*—Allen R. MacDonald
*Assistant Examiner*—Richemond Dorvil
*Attorney, Agent, or Firm*—Foley & Lardner

[57] ABSTRACT

A system and method for recognizing an utterance of a speech in which each reference pattern stored in a dictionary is constituted by a series of phonemes of a word to be recognized, each phoneme having a predetermined length of continued time and having a series of frames and a lattice point (i, j) of an i-th number phoneme at an j-th number frame having a discriminating score derived from Neural Networks for the corresponding phoneme. When the series of phonemes recognized by a phoneme recognition block is compared with each reference pattern, one i of the input series of phonemes recognized by the phoneme recognition block being calculated as a matching score as gk(i, j);

$$gk(i,j) = \max \begin{cases} gk(i-1,j) \\ gk(i-1,j-1) - p \end{cases} + ak(i,j)$$

wherein ak(i, j) denotes an output score value of the Neural Networks of the j-th number phoneme at the j-th number frame of the reference pattern and p denoted a penalty constant to avoid an extreme shrinkage of the phonemes, a total matching score is calculated as gk (I, J), I denoting the number of frames of the input series of phonemes and J denoting the number of phonemes of the reference pattern k, and one of the reference patterns which gives a maximum matching score is output as the word recognition.

8 Claims, 3 Drawing Sheets

SPEAKER INDEPENDENT SPEECH RECOGNITION SYSTEM AND METHOD USING NEURAL NETWORK AND/OR DP MATCHING TECHNIQUE

BACKGROUND OF THE INVENTION (1) Field of the Invention

The present invention relates to improved system and method for recognizing an isolated speech uttered by any speaker unspecified using a NN (Neural Network) and/or DP (Dynamic Programming) matching technique with a higher rate of speech recognition. This system and method can be applied to every speech data based control apparatus.

(2) Description of the Background Art

A Japanese Paper of Information Processing Volume 24 No. 8 published in Japan on August, 1983 by Ryohei NAKATSU (Yokoshuka Electrical Communication Laboratory) exemplifies a previously proposed speech Recognition Technology.

U.S. Pat. No. 4,637,045 exemplifies one of the control apparatuses to which the speech recognition system is applied.

SUMMARY OF THE INVENTION

It is an object to provide an improved speaker independent speech recognition system and method which can more accurately recognize a word utterance using a special technique such as NNs and/or DP matching.

The above-described object can be achieved by providing an apparatus comprising: a) input means for inputting an utterance by an unspecified person into an electrical signal; b) characteristic extracting means for receiving the electrical signal from the input means and converting the electrical signal into a time series of discrete characteristic multidimensional vectors; c) phoneme recognition means for receiving the time series of discrete characteristic multidimensional vectors and converting each of said vectors into a time series of phoneme discriminating scores calculated thereby; d) a dictionary which is so constructed as to previously store a reference pattern for each word to be recognized, each reference pattern having at least one phoneme label which has a single continued time length of its utterance; e) word recognition means for comparing the input time series of phoneme discriminating scores derived from said phoneme recognition means with each reference pattern stored in said dictionary using a predetermined Dynamic Programming technique so that one of the reference patterns which provides a maximum matching score to the time series of discriminating scores is a result of word recognition; and f) output means for outputting at least one of the words as the result of word recognition by said word recognition means in an encoded form thereof.

The above-described object can also be achieved by providing a method of speaker independent speech recognition comprising the steps of: a) inputting an utterance by an unspecified person into an electrical signal; b) receiving the electrical signal from the input means and converting the electrical signal into a time series of characteristic multidimensional vectors; c) receiving the time series of characteristic multidimensional vectors and converting each of said vectors into a time series of phoneme discriminating scores ; d) providing a dictionary which is so constructed as to previously store a reference pattern for each word to be recognized, each reference pattern having at least one phoneme label which has a single continued time length; e) comparing the input time series of phoneme discriminating scores derived from said phoneme recognition means with each reference pattern stored in said dictionary using a predetermined Dynamic Programming technique so that one of the reference patterns which provides a maximum matching score to the time series of phoneme discriminating scores is a result of word recognition; and f) outputting one of the words as the result of word recognition in an encoded form thereof.

DETAILED DESCRIPTION OF THE PREFERRED EMBODIMENTS

Reference will hereinafter be made to the drawings in order to facilitate a better understanding of the present invention.

Before explaining a first preferred embodiment according to the present invention, a previously proposed DP (Dynamic Programming) matching technique will briefly be explained.

In speech recognition systems and methods, it is a basic procedure to have, first of all, a single word recognized by a computer system when an utterance spoken by a person is recognized with a computer. This word recognition method includes the technique of DP matching.

When performing the word recognition, an input speech waveform is sampled at each interval of time by means of, e.g., an A/D converter and is converted into a time series of multidimensional characteristic vectors such as a time series of power spectra.

Similarly, words to be recognized are previously converted into the time series of multidimensional characteristic vectors and are previously registered in the computer system as reference (standard) patterns.

During the recognition process, similarities between the input time series of characteristic vectors and the time series of characteristic vectors as the reference patterns are derived for all of the stored reference patterns. Thereafter, one of the reference patterns which gives a highest similarity is output as the recognized word.

However, generally, it is not possible to directly compare the time series of characteristic vectors with the time series of characteristic vectors of the reference patterns.

This is because the length of the time of utterance of a word or sentence is different in persons due to personal errors and is largely different in days according to his condition or his mood during the utterance even if the same person utters.

An expansion or shrinkage of the length of time for the utterance is not uniform but varies in a non-linear form. The DP matching method is such that the dynamic programming method is used to convert a time axis so that the time series of the input characteristic vectors most preferably match with the time series of the characteristic vectors of the reference patterns and, thereafter, the similarity between them is derived.

Figure 1:
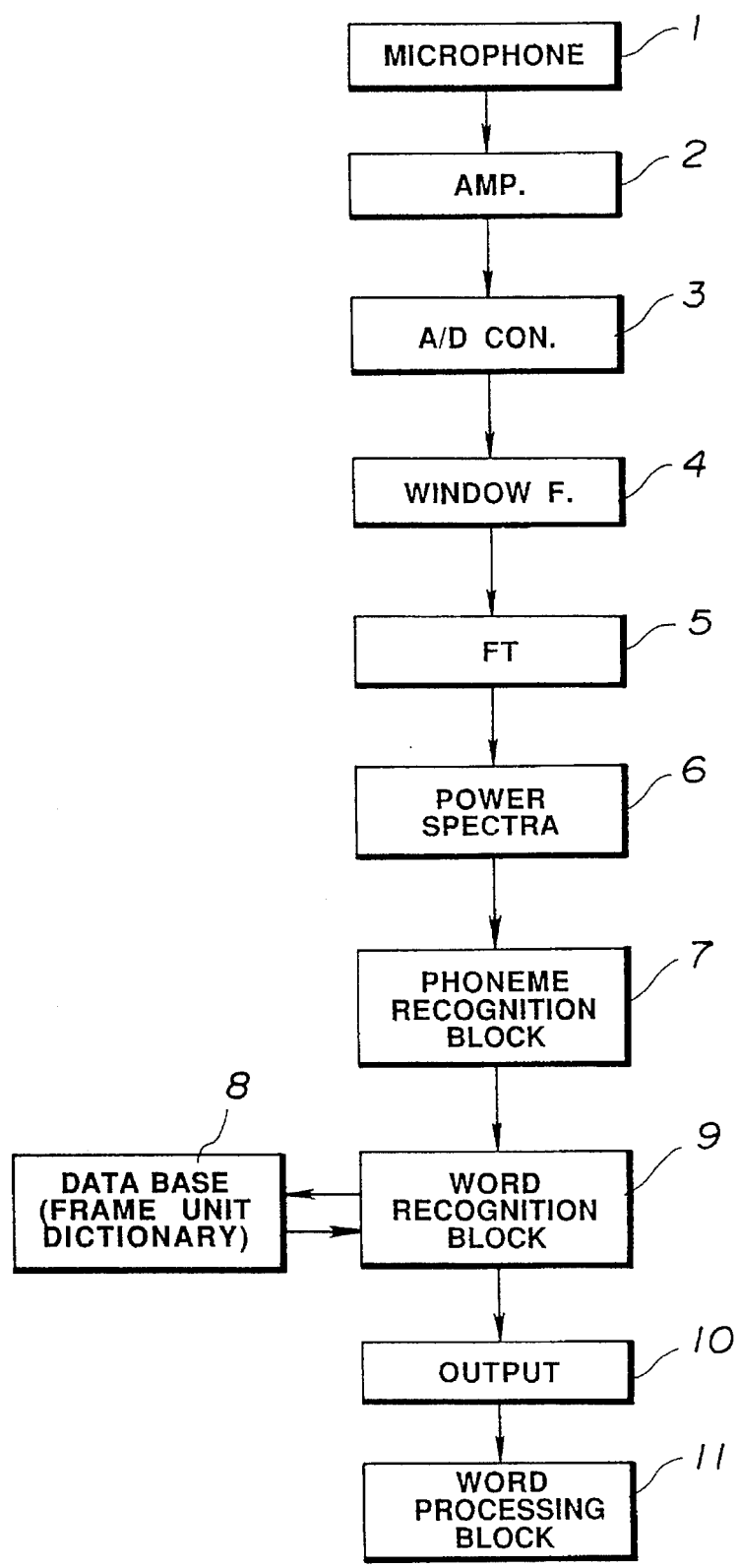
FIG. 1 is a circuit block diagram of a speech recognition system in a preferred embodiment according to the present invention.

FIG. 1 is a circuit block diagram of a speech recognition system in a preferred embodiment according to the present invention.

In FIG. 1, an utterance spoken by a person is input through a microphone 1 and an amplifier 2, both of which may be constituted by a telephone unit.

The input speech waveform is sampled and converted into a digital signal by means of an A/D converter 3.

The input digital signal is cut out into a frame signal by means of a window function generator 4 under a Hamming window function.

Then, each frame signal is converted into a power spectrum so as to constitute a time series of power spectra by means of an FT (Fourier Transform) analyzer 5.

The Fourier transformed series of power spectra are sent to a phoneme recognition block 7.

A dictionary 8 is provided to store words in a form of strings of phonemes to be recognized as will be described below:

The reference patterns expressed in phoneme notation forms for all words to be recognized are registered in the dictionary 8.

Although, each reference pattern expressed in the phoneme notation form includes an information of the length of time duration of each phoneme (for example, a word 赤い includes "AAAAAKKKAAAAAAIIII"), in the preferred embodiment, all continued time of length for all phonemes are indicated by 1 (for example, 赤い is registered in the form of a string of phonemes of "AKAI").

The phoneme recognition block 7 is constituted by Neural Networks of a back-propagation learning type.

A kind of the Neural Networks is exemplified by an English paper titled "Phoneme Recognition by Pairwise Discriminant TDNNs" authored by Jun-ichi Takami and Shigeki Sagayama (ATR Interpreting Telephony Research Laboratories), the disclosure of which is herein incorporated by reference.

In addition, the Neural Network Architecture is exemplified by a chapter 5 of a book titled NEURAL NETWORK ARCHITECTURES; An introduction by Judith E. Dayhoff copyright by Van Nostrand Reinhold of 1990 (Japanese translation rights arranged with Thompson International Publishing in N.Y. through The Asano Agency, Inc. in Tokyo of Japan).

Figure 2:
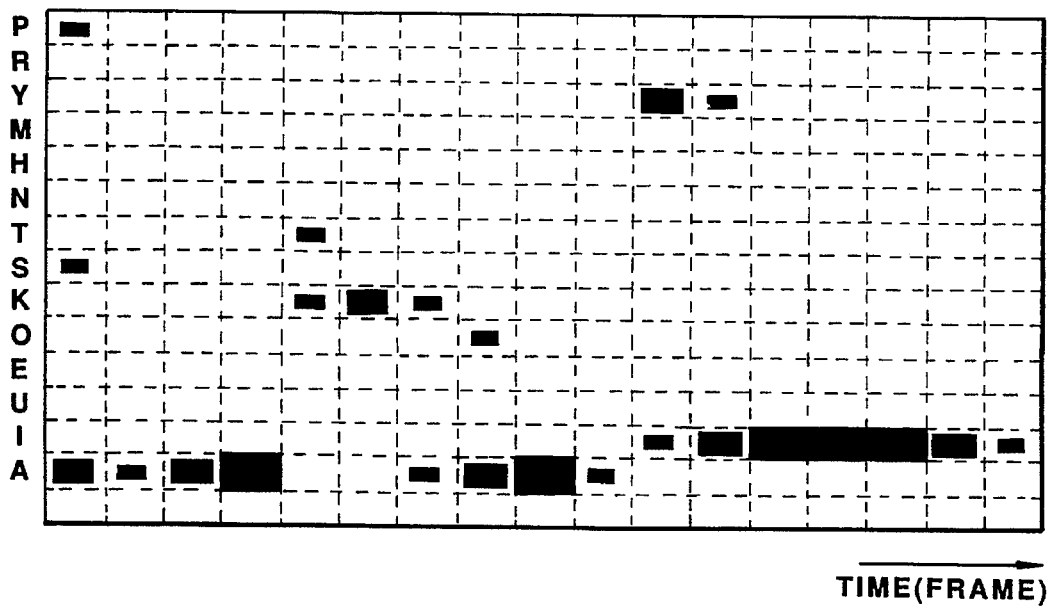
FIG. 2 is a matrix graph representing series of output vector examples of Neural Networks constituting a phoneme recognition block shown in FIG. 1 when a speaker has spoken the word "AKAI 赤い in Japanese)".

The Neural Networks used in the phoneme recognition block 7 converts the input time series of discrete characteristic vectors into the time series of discrimination scores on the respective phonemes as shown in FIG. 2. In FIG. 2, - denotes silence.

Figure 3:
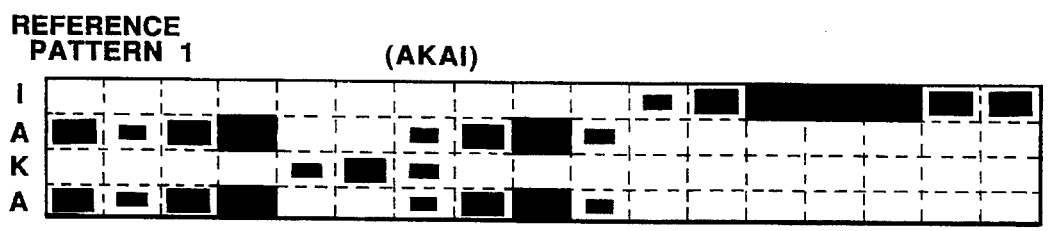
FIG. 3 is an example of calculation in matching with a reference pattern expressed in "AKAI" and stored in the dictionary shown in FIG. 1 whose lateral axis denotes an example of calculation in the matching of the series of output vectors of NNs shown in FIG. 2 with reference pattern word AKAI.
Figure 4:
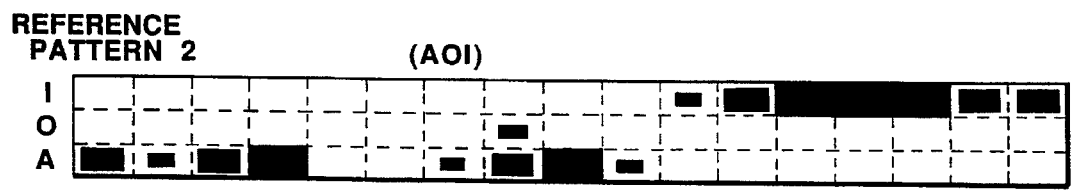
FIG. 4 is another example of calculation in matching with a reference pattern expressed in "AOI" and stored in the dictionary shown in FIG. 1 whose lateral axis denotes an example of the calculation in the matching of the series of output vectors of NNs shown in FIG. 2 with the reference pattern AOI.
Figure 5:
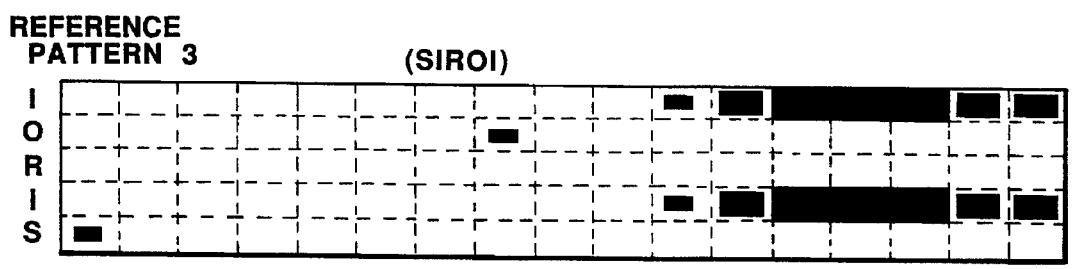
FIG. 5 is an example of calculation in matching with the reference pattern expressed in "SIROI" and stored in the dictionary shown in FIG. 1 whose lateral axis denotes an example of calculation in the matching of the series of output vectors of NNs shown in FIG. 2 with the reference pattern word SIROI.

Matrices of frames (corresponds to time) of input utterance in lateral axes and of phoneme labels of the reference patterns in longitudinal axes are prepared by the number of the reference patterns as shown in FIGS. 3 through 5.

Next, an output value (phoneme discriminating score) of a phoneme Pj of j-th number phoneme of the reference pattern k is copied onto a lattice point (i, j) corresponding to an i frame output from the Neural Networks. This copying is executed for all frames of all phonemes in all of the reference patterns (from a start of the input utterance to an end of the input utterance) as shown in FIGS. 3 through 5.

Figure 6:
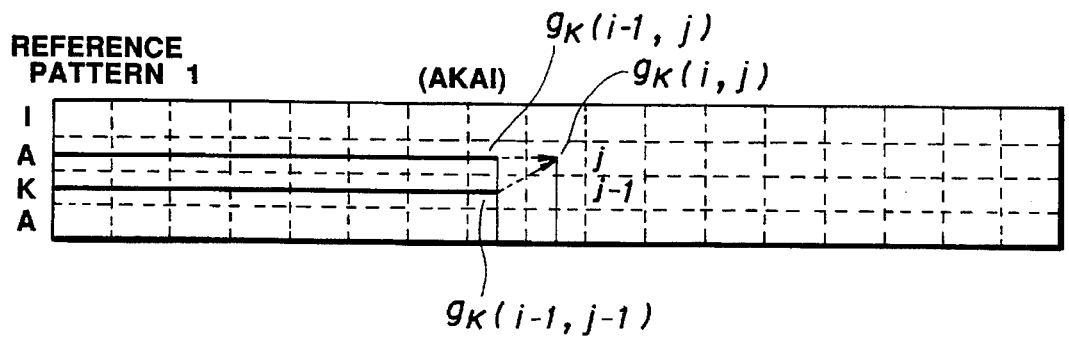
FIG. 6 is an example of a DP matching score in the case of a word "赤い(AKAI)" of the reference pattern shown in FIG. 3.

Then, as shown in FIG. 6, a matching score gk(i, j) is derived between the i-th number frame input phoneme and the j-th number phoneme of the reference pattern using a formula:

$$gk(i,j) = \max \begin{cases} gk(i-1,j) \\ gk(i-1,j-1) - P \end{cases} + ak(i,j)$$

wherein ak(i, j): output values of the i-th frame of the j-th phoneme of the reference pattern k of the Neural Networks, and P: a penalty constant to avoid an extreme shrinkage of the input utterance.

Then, gk(I, J) denotes a total matching score of the reference pattern k supposing that the number of frames of the input phonemes is I and the number of phonemes of the reference pattern k is J.

In this way, the discriminating scores are derived for all reference patterns.

Thus, one of the reference patterns which provides a maximum matching score is output to an output block 10 as the result of recognition of the word.

Since in the speech recognition system and method according to the present invention there is no need to include the information of the length of continued time of each phoneme occurs, the modification and/or increase in the words to be recognized can easily be carried out. In addition, the number of frames in each reference pattern are reduced so that the speed of recognition of the words can accordingly be reduced.

It will fully be appreciated by those skilled in the art that the foregoing description has been made to the preferred embodiment and various changes and modifications may be made without departing from the scope of the present invention which is to be defined by the appended claims.

What is claimed is:

1. An apparatus comprising:

a) input means for inputting an utterance by an unspecified person into an electrical signal;

b) characteristic extracting means for receiving the electrical signal from the input means and converting the electrical signal into a time series of discrete characteristic multidimensional vectors;

c) phoneme recognition means for receiving the time series of discrete characteristic multidimensional vectors and converting each of said vectors into a time series of phoneme discriminating scores calculated thereby;

d) a dictionary for pre-storing a reference pattern for each word to be recognized, each reference pattern comprising at least one phoneme label comprising a continuation time length for each phoneme stored in a data base of said dictionary, said continuation time length being uniformly set to a predetermined time length;

e) word recognition means for comparing an input time series of phoneme discriminating scores derived from said phoneme recognition means with each reference pattern stored in said dictionary using a predetermined Dynamic Programming technique so that one of the reference patterns having a maximum matching score to the time series of discriminating scores is a result of word recognition; and f) output means for outputting the word based on the result of word recognition using said word recognition means in an encoded form thereof.

2. An apparatus as set forth in claim 1, wherein in said phoneme recognition means continuity of frames representing the respective characteristic vectors and said predetermined Dynamic Programming technique has a matching score gk(i, j) between an i frame input series of phonemes and a j number phoneme of one of reference patterns k derived as:

$$gk(i,j) = \max \left\{ \begin{array}{l} gk(i-1,j) \\ gk(i-1,j-1) - p \end{array} \right. + ak(i,j)$$

wherein ak(i, j) denotes an output score value of Neural Networks constituting a phoneme recognition block in the case where an i frame phoneme corresponds to a j number phoneme of a reference pattern k and p denotes a penalty constant to avoid an extreme shrinkage of a series of phonemes input from the Neural Networks, and a total matching score of gk(I, J) is derived when the number of frames of an input series of phonemes is I and the numbers of phonemes of the reference pattern k is J.

3. An apparatus as set forth in claim 2, wherein said word recognition means outputs the reference pattern k having a maximum matching score gk (I, J) from among the total matching score for all reference patterns K.

4. An apparatus as set forth in claim 1, wherein said phoneme recognition means includes back-propagation type parallel run Neural Networks.

5. An apparatus as set forth in claim 4, wherein in said phoneme recognition means, matrices of frames I taken in lateral axes and the series of phoneme labels J constituting respective reference patterns taken in longitudinal axes are prepared by the number of the reference patterns and an output score value of the single phoneme Pj of the i-th frame of the Neural Networks is copied to a lattice point (i, j) corresponding to the i-th frame Pj of the j-th number phoneme of the reference pattern k, said preparations being carried out for all of said reference patterns and all said reference patterns being stored in said dictionary.

6. An apparatus as set forth in claim 5, wherein said phoneme labels of one of the reference patterns stored in said dictionary has a single continued time length such as AKAI for the word AKAI.

7. A method of speaker independent speech recognition comprising the steps of:

a) inputting into an input means an utterance by an unspecified person and obtaining an electrical signal;

b) receiving the electrical signal from the input means and converting the electrical signal into a time series of characteristic multidimensional vectors;

c) receiving into a phoneme recognition means the time series of the characteristic multidimensional vectors and converting each of said vectors into a time series of phoneme discriminating scores;

d) pre-storing in a dictionary a reference pattern for each word to be recognized, each reference pattern comprising at least one phoneme label having a continuation time length for each phoneme stored in a data base of said dictionary, said continuation time length being uniformly set to a predetermined time length;

e) comparing the time series of phoneme discriminating scores derived from said phoneme recognition means with each said reference pattern stored in said dictionary using a predetermined Dynamic Programming technique so that one of the reference patterns having a maximum matching score to the time series of phoneme discriminating scores is a result of word recognition; and f) outputting the word as the result of word recognition in an encoded form thereof.

8. A speaker independent apparatus of word recognition comprising:

a) input means for inputting an utterance by an unspecified person and obtaining an electrical signal;

b) characteristic extracting means for receiving the electrical signal from the input means and converting the electrical signal into a time series of discrete characteristic multidimensional vectors;

c) phoneme recognition means for receiving the time series of discrete characteristic multidimensional vectors and converting each of said vectors into a time series of phoneme discriminating scores calculated thereby;

d) a dictionary for pre-storing a reference pattern for each word to be recognized, each reference pattern comprising at least one phoneme label having a continuation time length for each phoneme stored in a data base of said dictionary, said continuation time length being uniformly set to a predetermined time length;

e) word recognition means for comparing an input time series of phoneme discriminating scores derived from said phoneme recognition means with each reference pattern stored in said dictionary under a predetermined dynamic programming technique so that one of the reference patterns having a maximum matching score to the time series from the discriminating scores is a result of word recognition; and f) output means for outputting the word based on the result of word recognition using said word recognition means in an encoded form thereof, wherein in said phoneme recognition means a continuity of frames representing the respective characteristic vectors and said predetermined Dynamic Programming technique has a matching score denoted by gk(i, j) between an i-th number frame input series of phonemes and a j-th number phoneme of one of the reference patterns k derived using the following equation:

$$gk(i,j) = \max \begin{cases} gk(i-1,j) \\ gk(i-1,j-1) - p \end{cases} + ak(i,j)$$

wherein ak(i, j) denotes an output score value of a neural network constituting a phoneme recognition means in the case where an i-th number frame corresponds to a j-th number phoneme of a reference pattern k and p denotes a penalty constant to avoid an extreme constraint of the time-series of phonemes input from the neural networks and a total matching score of gk(I, J) is derived when the number of the frames of the input series of phonemes is I and the number of phonemes of the reference pattern is J.

* * * * *